UNITED STATES PATENT OFFICE.

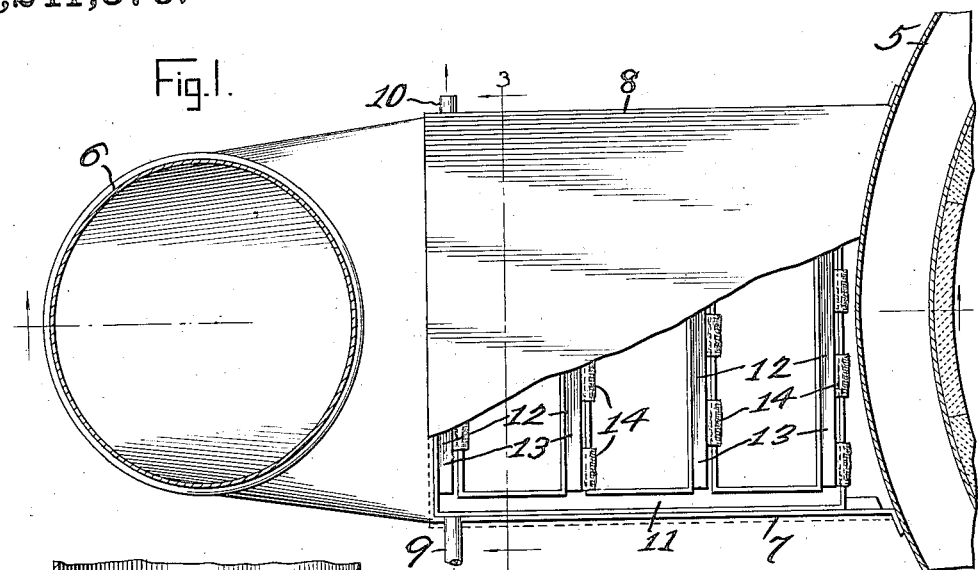
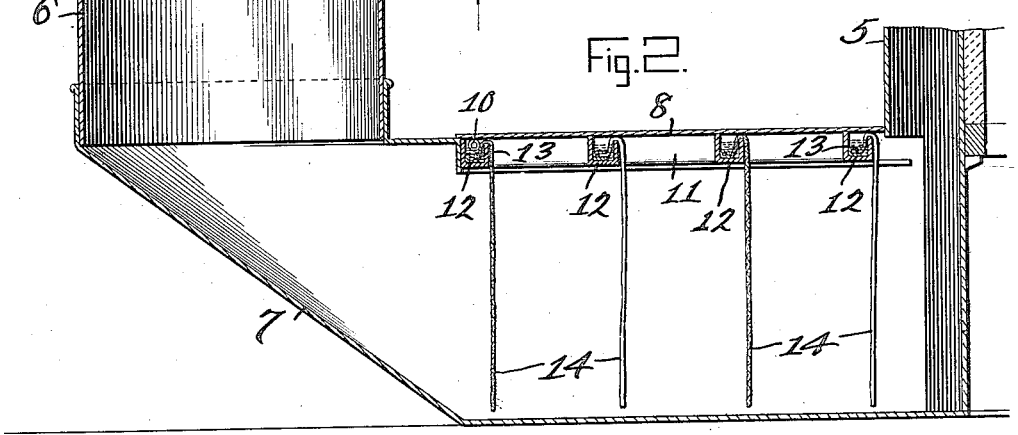
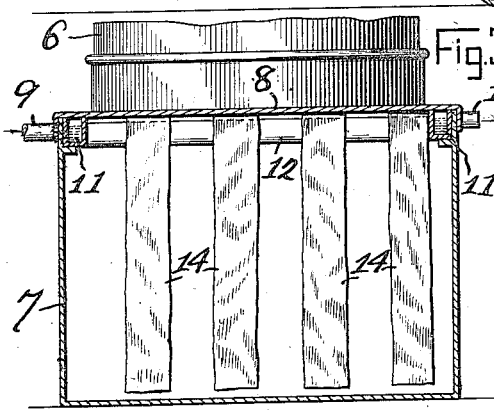
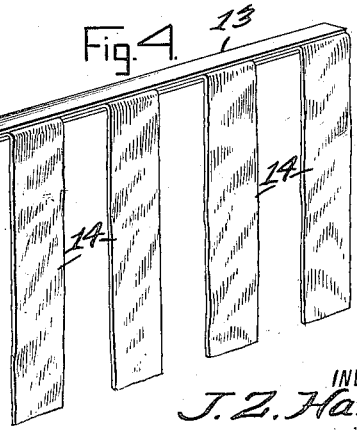

JOHN ZACIUS HANSON, OF POCATELLO, IDAHO.

AIR-FILTER.

1,241,376.

Specification of Letters Patent.

Patented Sept. 25, 1917.

Application filed December 12, 1916. Serial No. 136,579.

*To all whom it may concern:*

Be it known that I, JOHN Z. HANSON, a citizen of the United States, and a resident of Pocatello, in the county of Bannock and State of Idaho, have invented certain new and useful Improvements in Air-Filters, of which the following is a specification.

My invention relates to warm air furnaces and heating plants, and the main object thereof is to provide means interposed in the return air connection for filtering and humidifying the air on its passage from the furnace.

My invention contemplates the provision of a plurality of sets of a plurality of saturated fabric strips each in the path of the air, the strips being preferably staggered in the adjacent sets to form a tortuous path for the air, and the provision of means for automatically maintaining said strips in a saturated condition.

My invention is fully described in the following specification, of which the accompanying drawings form a part, in which like characters refer to like parts in each of the views, and in which:—

Figure 1 is a fragmentary plan view of a warm air heating system provided with my invention, partly broken away and also partly in section;

Fig. 2 is a section taken on the line 2—2 of Fig. 1;

Fig. 3 is a section taken on the line 3—3 of Fig. 1; and Fig. 4 is a perspective view of one of the units of my device, detached.

Referring to the drawings 5 represents a warm air furnace and 6 the return pipe between which my invention is arranged in the present embodiment, said invention comprising a casing 7 provided with a removable cover 8, with a water supply pipe 9 and an overflow pipe 10 leading thereto and therefrom adjacent the top thereof and to and from a reservoir 11 including a channed on each side of the casing 7 and a plurality of transverse channels 12 communicating at their ends with the side channels, the transverse channels being preferably spaced at equidistant points, although not necessarily so.

Lying in each transverse channel 12 is a holder 13 for a plurality of strips or streamers 14 held by their ends therein and spaced apart to provide openings therebetween, these strips depending from the respective channels and extending approximately to the bottom of the casing 7 and, as stated, and as shown in Fig. 1, I stagger the strips in the adjoining units or sets whereby the air passing through the casing must come in contact with the strips and will follow a tortuous path.

The strips 14 are maintained in a saturated condition by capillary attracation, on the principle of a lamp-wick, and the air passing through the casing 7 is therefore moistened with the consequent benefit to the occupants of a house equipped with my invention.

The strips are provided of a width and spaced apart for distances allowing full volume of air and they may be made of any suitable material wherein water is absorbed by capillary attraction, and said strips also serve to remove dust or extraneous matter carried by the air from the air, such dust or other matter being deposited upon the strips 14. Because of the manner of suspending the strips 14 the several units may be readily removed at will for cleansing and, because of their low cost, extra units may be carried for use when one set of units is being washed and dried, although the drying thereof is not necessary if they are to be used at once as will be understood.

While I have shown a preferred method of suspending the strips to insure a constant dampening thereof, I do not desire to limit myself thereto, as other methods equally efficient may suggest themselves and be within the spirit of my invention and within the scope of the appended claims.

Having fully described my invention, what I claim as new, and desire to secure by Letters Patent, is:—

1. A device of the class described for use in the return connection of a furnace, comprising a plurality of units longitudinally placed in such connection and consisting each of a plurality of absorbent strips the strips of each unit staggered with relation to those of adjacent units and means for maintaining said strips in a state of saturation.

2. A device of the class described for use in the return connection of a furnace, comprising a plurality of units, each unit consisting of a plurality of absorbent strips, the strips of each unit staggered with relation to the strips of an adjacent unit, and means for maintaining said strips in a state of saturation by capilliary attraction.

3. As an article of manufacture for use in the return connection of a furnace, a casing provided with a plurality of channels adapted to contain water, and an air moistening unit for each channel comprising a holder resting in each channel and a plurality of absorbent strips held by one end in said holder and suspended from the respective channels in the casing.

4. As an article of manufacture, for use in a warm air return connection from a furnace, a casing provided with a channel at the top of each side thereof, and a plurality of channels joining said side channels and spaced apart, means for supplying water to said channels, and a plurality of absorbent strips depending from each transverse channel and having their upper ends in the water in said channel.

JOHN ZACIUS HANSON.